United States Patent Office 3,841,970
Patented Oct. 15, 1974

3,841,970
IMMOBILIZED ENZYMES
Joseph S. Matthews, Ohara Township, Pa., assignor to Gulf Research & Development Company, Pittsburgh, Pa.
No Drawing. Filed Dec. 19, 1972, Ser. No. 316,452
Int. Cl. C07g 7/02
U.S. Cl. 195—63               5 Claims

ABSTRACT OF THE DISCLOSURE

Enzymes are immobilized by reaction with a solid higher molecular weight glycidyl ether of bisphenol A in which the hydroxyl groups have been reacted with acrylonitrile or methacrylonitrile. Glucose oxidase is immobilized by reaction with this epoxy polymer.

---

The invention relates to immobilized enzymes and to a method for their immobilization using an epoxy containing polymer which is prepared by reacting acrylonitrile or methacrylonitrile with the alcoholic hydroxyl groups of polymeric diglycidyl ether of bisphenol A having at least one repeating unit. Acrylonitrile and methacrylonitrile are also referred to herein as the nitrile reactant.

Many enzymes can be separated from their natural environment in a living organism and recovered for catalytic use such as, for example, in an industrial process or in a suitable analytical application. Since enzymes are water soluble, some enzymes are able to function in their natural environment in solution, however, most enzymes function within the living organism in association with a membrane. An enzyme which is removed from the organism and is used as a catalyst in an aqueous solution tends to become denatured because of reduced stability in the foreign environment. Furthermore, it is difficult to recover active enzyme catalyst for reuse from the product solution containing the enzyme and impurities. It has been proposed to artificially insolubilize enzymes to overcome these disadvantages by chemically or physically attaching the enzyme to a water-insoluble substrate or support to form a synthetically immobilized enzyme analogous to the membrane-enzyme relationship in nature.

I have discovered a novel method for synthetically immobilizing and supporting enzymes in which an enzyme or mixture of enzymes is chemically united with a solid and water-insoluble, epoxy containing polymer. Both the stability and the activity during storage and use of the resulting immobilized enzyme are thereby substantially enhanced by the epoxy containing polymer. Not only does the enzyme immobilized by the epoxy containing polymer retain its natural activity to a substantial degree, but it can also be repeatedly reused in a batch process or used over extended periods of time in a continuous process with substantial retention of its activity.

In the immobilized enzyme of my invention the enzyme is chemically bound or coupled to the epoxy containing polymer through one or more epoxy groups of the support or carrier. This coupling reaction takes place with a suitable functional group in the enzyme molecule. Since an epoxy group can react with many different functional groups, the epoxy containing polymer carrier is reactive with and can immobilize any enzyme which is capable of being immobilized. Thus, the present epoxy containing polymer can advantageously immobilize a large number and variety of enzymes for catalytic utility.

The epoxy containing polymer, by which the enzyme is immobilized, is a higher molecular weight polymeric form of diglycidyl ether of bisphenol A which is modified by reaction of the hydroxyl groups of the polymer with the nitrile reactant at the double bond of the nitrile reactant to form ether linkages and dependent nitrile groups. Surprisingly this nitrile modified polymer can immobilize a substantially greater amount of enzyme than the unmodified polymer. It is further surprising that the enzyme immobilized on the nitrile modified polymer is substantially more active than enzyme immobilized on unmodified polymer.

Two molecules of epichlorohydrin and one molecule of bisphenol A will react to form one molecule of diglycidyl ether of bisphenol A. Polymeric forms of diglycidyl ether of bisphenol A contain at least one repeating unit, $n$, formed from one molecule of epichlorohydrin and one molecule of bisphenol A. Each repeating unit contains an alcoholic hydroxyl group which is reactive with acrylonitrile or methacrylonitrile according to my invention. In preparing a polymeric form of diglycidyl ether of bisphenol A by the reaction of epichlorohydrin with bisphenol A, a variety of molecular species are obtained of different molecular weight. In my novel process for immobilizing enzymes, I use a solid polymeric form of diglycidyl ether of bisphenol A having an average of at least about one repeating unit. The polymer thereforee contains an average of at least about one hydroxyl group per molecule available for reaction with the acrylonitrile or methacrylonitrile. Each linear molecule of diglycidyl ether of bisphenol A including the polymeric form also contains two epoxy groups which are available for reaction with the enzyme. Suitable solid polymeric forms of diglycidyl ether of bisphenol A are commercially available. Additional information regarding the nature and characteristics of higher molecular weight diglycidyl ether of bisphenol A also called polymeric diglycidyl ether of bisphenol A is found in Handbook of Epoxy Resins by Lee and Neville, 1967, particularly in Chapter 2.

In reacting the solid polymer of diglycidyl ether of bisphenol A with the nitrile reactant, a stoichiometric excess of the nitrile reactant is used to serve as a solvent for the polymer. The reaction is preferably carried out under reflux at the boiling point of the nitrile reactant, which is about 77° C. for acrylonitrile and about 90° C. for methacrylonitrile. If the polymer is not completely soluble in the nitrile reactant, a suitable liquid chlorinated hydrocarbon solvent can be used in conjunction with the nitrile reactant. The epoxy polymer and the nitrile reactant are heated under conditions of reflux, preferably in the presence of a tertiary amine base catalyst, such as triethylamine, until the reaction is completed. The polymer product is then precipitated by pouring the solution into a liquid in which the polymer is insoluble such as a hydrocarbon solvent including hexane, heptane, and the like, a lower alkyl alcohol including methanol, butanol, and the like, water, or mixtures of water and alcohol, and the like.

The reacted polymer is then dried and finely powdered for reaction with the enzyme. This immobilization reaction is preferably carried out at a relatively low temperature, such as about 0° to 10° C. to avoid undue denaturation of the enzyme and with gentle agitation to insure good contact of the enzyme with the polymer. This enzyme immobilization reaction is carried out for a long enough time to bind a suitable amount of the enzyme on the polymer, generally for about one to about eight hours.

In order to bind an enzyme to the epoxy containing polymer, the polymer is dispersed in a water solution of an enzyme and then the mixture is agitated. Generally the weight of the enzyme in the solution is no greater than about one percent of the weight of the polymer support which is used. The solid epoxy polymer contains a substantial number of epoxy groups at the surface of the particles available for reaction with the enzyme. During the immobilization reaction, the enzyme comes into reactive contact with the polymer. The reaction binding each enzyme molecule to the polymer occurs through one or more of a large number of the epoxy group available for reaction on the surface of the polymer particles and through one or more epoxy reactive groups in the enzyme. Epoxy reactive groups are listed in Appendix 5–1 of the Lee and Neville book.

The following examples are set out to illustrate the invention and to provide a better understanding of its details and advantages. An International Unit (I.U.) is defined as the amount of enzyme which converts one micromol of substrate per minute. The Epon resins were obtained from Shell Chemical Company.

Example 1

A 25 gram portion of Epon 1010, a solid diglycidyl ether of bisphenol A having an average molecular weight of about 10,000, was introduced into a round bottom 500 ml. flask fitted with reflux condenser and heating mantle. This epoxy polymer was dissolved in 100 ml. of chloroform by refluxing. After solution was obtained, 50 ml. of acrylonitrile and five ml. of triethylamine were added and the mixture was refluxed overnight.

The contents were then evaporated to dryness under a vacuum. The solid residue was dissolved in a solution containing 50 ml. of dimethylformamide and 100 ml. of acetone. The polymer was precipitated from solution by slowly pouring the polymer solution into two liters of a 1:1 volume ratio mixture of methanol and water. The solid precipitate was dried under vacuum yielding 22 grams of a white powder. The powder was ground and sieved through 100 mesh. The epoxy equivalent value was found to be 31,000 and the nitrogen content was determined to be 1.13 weight percent.

A 500 mg. portion of this nitrile modified epoxy resin was placed into a 30 ml. screw cap bottle containing 15 ml. of an aqueous solution of 1.725 mg. of glucose oxidase having an activity of 183 I.U. The mixture was shaken in a cold room at about 0° C. for two hours. The solid product was filtered and by analysis was found to contain 1.664 mg. of immobilized glucose oxidase. The activity of this product was determined to be 54 I.U. The same procedure was repeated using unmodified Epon 1010 resin.

Example 2

A 12 gram portion of Epon 1007, a solid diglycidyl ether of bisphenol A having an average molecular weight of about 4,500, was placed in the reaction flask described in Example 1 together with 50 ml. of acrylonitrile and five ml. of triethylamine. Sufficient trichloroethylene was added through the condenser during reflux to bring the resin into solution and reflux was continued overnight.

The solution containing the modified reaction product was poured into 1.5 liters of rapidly stirred hexane. The resin precipitated as a paste and was redissolved in acetone. When the acetone solution was added to water a very fine colloidal suspension of the modified polymer was obtained. This suspension was precipitated by the addition of concentrated hydrochloric acid. The precipitate was filtered, washed free of acid, dried under vacuum, and ground to pass through 100 mesh screen. The nitrogen content was found by analysis to be 2.02 weight percent and the epoxy equivalent value was determined to be 5,400.

Glucose oxidase was immobilized on this polymer from a solution having an activity of 200 I.U. in the same manner as described in Example 1 to form immobilized glucose oxidase having an activity of 95 I.U. The procedure was repeated to produce immobilized glucose oxidase using unmodified Epon 1007 resin.

Example 3

A 25 gram portion of Epon 1001, a solid diglycidyl ether of bisphenol A having an average molecular weight of about 1,000, was placed with 150 ml. of acrylonitrile in the reaction flask described in Example 1. The resulting solution was refluxed for two hours. The acrylonitrile was vacuum evaporated and the resulting solid was dissolved in acetone. This acetone solution was slowly poured into two liters of water with rapid stirring. The white precipitate was filtered, dried and ground to 100 mesh. The nitrogen content was determined to be 7.32 weight percent and the epoxy equivalent value was found to be 1,573.

Glucose oxidase was immobilized on this modified polymer from a solution having an activity of 183 I.U. in the same manner as described in Example 1 to form immobilized glucose oxidase having an activity of 23 I.U. This procedure was repeated to produce immobilized glucose oxidase using unmodified Epon 1001 resin.

The results of Examples 1–3 are summarized in Table I.

TABLE I

| Example | Resin [a] | Nitrogen, wt. percent | Enzyme on resin, mg./gm. | Percent activity [b] |
|---|---|---|---|---|
| 1 | Epon 1010–M | 1.13 | 3.33 | 30 |
| 1 | Epon 1010 | 0 | 1.37 | 0.6 |
| 2 | Epon 1007–M | 2.02 | 2.25 | 48 |
| 2 | Epon 1007 | 0 | 0.25 | 10 |
| 3 | Epon 1001–M | 7.32 | 1.54 | 12 |
| 3 | Epon 1001 | 0 | 1.48 | 1.8 |

[a] The notation –M denotes the nitrile modified resin.
[b] Percent activity=activity of bound glucose oxidase×100/activity of glucose oxidase in the treating solution.

The epoxy equivalent value indicates the average number of epoxy groups per molecule. The epoxy equivalent value is obtained by dividing the average molecular weight of the epoxy resin by its epoxide equivalent weight, that is, the grams of epoxy resin containing one gram equivalent of epoxide. The increase in the epoxy equivalent value of the resin after treatment with the acrylonitrile in the above examples suggests that the resin is further polymerized during this reaction.

It is to be understood that the above disclosure is by way of specific example and that numerous modifications and variations are available to those of ordinary skill in the art without departing from the true spirit and scope of our invention.

I claim:

1. A method for the preparation of an immobilized enzyme which comprises reacting an aqueous solution of an enzyme with an epoxy containing polymer prepared by the reaction of a solid polymeric diglycidyl ether of bisphenol A having an average of at least about one repeating unit with a stoichiometric excess of a nitrile reactant selected from acrylonitrile and methacrylonitrile.

2. A method for the preparation of an immobilized enzyme in accordance with claim 1 in which the enzyme is glucose oxidase.

3. A method for the preparation of an immobilized enzyme in accordance with claim 2 in which the nitrile reactant is acrylonitrile.

4. An immobilized enzyme comprising a solid, polymeric diglycidyl ether of bisphenol A having an average of at least one repeating unit and having acrylonitrile or methacrylonitrile chemically bound to said solid, polymeric diglycidyl ether of bisphenol A through the double bond of the acrylonitrile or the methacrylonitrile and the hydroxyl group of each said repeating unit and having an active enzyme chemically bound to said solid, polymeric diglycidyl ether of bisphenol A through the epoxy groups of said solid, polymeric diglycidyl ether of bisphenol A.

5. An immobilized enzyme in accordance with claim 4 in which the enzyme is glucose oxidase.

References Cited

UNITED STATES PATENTS

| | | | |
|---|---|---|---|
| 3,282,702 | 11/1966 | Schreiner | 195—63 X |
| 3,377,406 | 4/1968 | Newey et al. | 260—837 |
| 3,705,084 | 12/1972 | Reynolds | 195—63 |

FOREIGN PATENTS 2,102,514  7/1971  Germany.

DAVID M. NAFF, Primary Examiner

U.S. Cl. X.R.

195—68, DIG 11